United States Patent
Du et al.

(10) Patent No.: US 11,409,712 B2
(45) Date of Patent: Aug. 9, 2022

(54) SMALL-FILE STORAGE OPTIMIZATION SYSTEM BASED ON VIRTUAL FILE SYSTEM IN KUBERNETES USER-MODE APPLICATION

(71) Applicant: Sun Yat-sen University, Guangdong (CN)

(72) Inventors: Liang Du, Guangdong (CN); Guixin Guo, Guangdong (CN); Kangyou Zhong, Guangdong (CN); Yunfei Du, Guangdong (CN); Yutong Lu, Guangdong (CN); Zhongzhu Zhou, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 0 days.

(21) Appl. No.: 17/206,869

(22) Filed: Mar. 19, 2021

(65) Prior Publication Data
US 2021/0294778 A1    Sep. 23, 2021

(30) Foreign Application Priority Data
Mar. 19, 2020  (CN) .......................... 202010195318.5

(51) Int. Cl.
| | | |
|---|---|---|
| *G06F 12/00* | (2006.01) | |
| *G06F 16/00* | (2019.01) | |
| *G06F 16/182* | (2019.01) | |
| *G06F 16/188* | (2019.01) | |
| *G06F 16/11* | (2019.01) | |
| *G06F 11/07* | (2006.01) | |
| *G06F 21/31* | (2013.01) | |
| *G06F 21/62* | (2013.01) | |

(52) U.S. Cl.
CPC ........ *G06F 16/183* (2019.01); *G06F 11/0772* (2013.01); *G06F 16/122* (2019.01); *G06F 16/188* (2019.01); *G06F 21/31* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 2009/0271412 A1* | 10/2009 | Lacapra | ............... | H04L 67/1097 |
| 2020/0012619 A1* | 1/2020 | Gupta | ................... | G06F 16/113 |

\* cited by examiner

*Primary Examiner* — Tuan A Pham
(74) *Attorney, Agent, or Firm* — Muncy, Geissler, Olds & Lowe, P C.

(57) ABSTRACT

A small-file storage optimization system based on a virtual file system in a KUBERNETES user-mode application which is applied to a target file system includes a network file system including a network file system server and a network file system client, a user-mode application mounted on a shared directory exposed by the network file system server through the network file system client, and a virtual file system including a virtual file system client and a virtual file system server. A file block creating and formatting module in the virtual file system server creates a virtual file block for storing small files on one or more object storage target devices of the target file system, and the virtual file block is mounted on the shared directory exposed by the network file system server.

9 Claims, 6 Drawing Sheets

SMALL-FILE STORAGE OPTIMIZATION SYSTEM BASED ON VIRTUAL FILE SYSTEM IN KUBERNETES USER-MODE APPLICATION

TECHNICAL FIELD

The invention relates to the field of file system storage, in particular to a small-file storage optimization system based on a virtual file system in a KUBERNETES user-mode application.

BACKGROUND

Nowadays, data on the Internet presents an explosive growth, and various applications for social networking, mobile communication, online video, e-commerce, and the like usually generate several hundreds of millions, even billions, dozens of billions of massive small files. Due to huge challenges in aspects of metadata management, access performance, storage efficiency, and the like, a problem of massive small files has become a recognized difficult problem in the industry.

In the field of computer storage, storage performance of small files is an important aspect that affects the storage performance of an entire file system. Especially in the field of deep learning, read-write performance of massive small files represented by small pictures and small texts has an important impact on the overall efficiency of an entire deep learning training process.

KUBERNETES is an open-source system for automating deployment, scaling, and management of containerized applications, which provides a platform for automating deployment, expansion, and running application containers across host clusters. It supports a series of container tools including DOCKER and the like, and groups containers that make up an application in logical units to facilitate management and discovery. A container takes up fewer resources and can be deployed quickly. Each application can be packaged into a container image. A one-to-one relationship between each application and the container also offers a greater advantage to the container. The container can be used to create the container image for the application in a build or release phase because each application does not need to be stacked and combined with the rest of applications and does not depend on a production environment infrastructure, which makes it possible to provide a consistent environment from research and development to testing and production. Similarly, the container is more lightweight and more transparent than a virtual machine, which facilitates monitoring and managing.

KUBERNETES includes a MASTER node and common (worker) nodes, in which each common node includes a POD (a container set), and components such as a KUBELET and a KUBE-PROXY, each POD includes one or more CONTAINERS, and each node corresponds to a virtual machine/physical machine.

A target file system can be several distributed file systems, such as a Lustre file system. Lustre is a cluster storage architecture. The core component of Lustre is the Lustre file system. The Lustre file system can run on a Linux operating system and provides a POSIX*standard-compliant UNIX file system interface. Lustre is commonly used in high performance computing clusters and can provide PB-level storage and hundreds of gigabytes per second of throughput. When storage capacity of the Lustre file system is gradually increased, read-write efficiency of the small files is significantly reduced as the amount of files increases when the small files continue to be stored in the Lustre file system. In a scenario where a used capacity in the file system is relatively large, when reading and writing massive small files, the file system needs to retrieve the metadata of specific small files in the entire file system, which is an important factor that affects the storage performance of the small files.

SUMMARY

The present invention provides a small-file storage optimization system based on a virtual file system in a KUBERNETES user-mode application, which is used to address a problem of reduced efficiency of small-file storage and reading.

According to the present invention, the optimization system is applied to a target file system and includes a user-mode application, a network file system and a virtual file system. The virtual file system includes a virtual file system client and a virtual file system server. The network file system includes a network file system server and a network file system client, and the user-mode application includes the network file system client;

the network file system server and the virtual file system are encapsulated in the same image that is located in an NFS specific image container, the user-mode application is encapsulated in a user-mode application image that is located in a user-mode application image container, the NFS specific image container and the user-mode application image container are both deployed in a KUBERNETES cluster, and the target file system is a file system used by the KUBERNETES cluster; after running the user-mode application image container and running the NFS specific image container in a method of PRIVILEGED=TRUE, the user-mode application, the network file system client, and the network file system server and the virtual file system are all in the same KUBERNETES cluster network, the user-mode application is mounted on a shared directory exposed by the network file system server through the network file system client, and the user-mode application is used to send a virtual file block creation request to the virtual file system client;

the virtual file system client is deployed on a target file system client, and the virtual file system client is used to send the virtual file block creation request sent by the user-mode application to the virtual file system server. The virtual file system server is deployed on an object storage server of the target file system. The virtual file system server includes a file block creating and formatting module. The file block creating and formatting module is used to create and format a virtual file block on one or more object storage target devices of the target file system according to the virtual file block creation request sent by the virtual file system client. The virtual file block is used to store small files and is mounted on the shared directory exposed by the network file system server.

The optimization system according to the invention is built on the KUBERNETES cluster which is deployed with the user-mode application image container and the NFS specific image container. The two containers can be located at any node of KUBERNETES, the image encapsulated with the user-mode application is set in the user-mode application image container, and the image encapsulated with the network file system server and the virtual file system is set in the NFS specific image container. The optimization system is applied to the target file system that is the file system used by the KUBERNETES cluster. The target file system includes an object storage server and an object storage target device, in which the object storage server is used to be responsible for interaction and data storage between the target file system client and physical storage, and the target file system client accesses file data stored in the object storage target device through the object storage server.

The user-mode application image container and the NFS specific image container are run in the KUBERNETES environment. After the NFS specific image container is run, the virtual file system client in the virtual file system is deployed on the target file system client, and the virtual file system server in the virtual file system is deployed on the object storage server of the target file system. After the user-mode application image container is run, the user-mode application sends the virtual file block creation request to the virtual file system client. After receiving the request, the virtual file system client transmits the request to the virtual file system server deployed on the object storage server through the target file system client. The virtual file system server includes a file block creating and formatting module, and can be used to manage one or more object storage target devices since this module is on the object storage server, and create and format virtual file blocks on one or more object storage target devices to store small files after obtaining the virtual file block creation request sent by the virtual file system client.

The user-mode application is mounted on the shared directory exposed by the network file system server through the network file system client included in the user-mode application. By exposing the shared directory, the network file system server allows a host of the network file system client to be able to access files in the shared directory, and the access process is the same as accessing local storage. The virtual file block created above is also mounted on the shared directory. The virtual file block created on the object storage target device is mounted on the shared directory, thereby realizing a purpose that the user-mode application reads and writes small files to the virtual file block through the client and server of the network file system.

In a KUBERNETES cluster environment, the virtual file block is set on one or more object storage target devices of the target file system in order to specially store the small files, so that the small files are stored in the virtual file block. The virtual file system can greatly improve read-write performance of massive small files, and preserves advantages of distributed shared storage that is easy to be managed and can be mounted anywhere based on a network.

Further, the user-mode application is further used to send a virtual file block parameter to the virtual file system client, and the virtual file system client is also used to send the virtual file block parameter sent by the user-mode application to the virtual file system server. The virtual file block parameter includes a virtual file block execution request parameter, and the virtual file system server includes a request parameter processing module. The request parameter processing module is used to obtain the virtual file block execution request parameter sent by the virtual file system client, and determine whether the virtual file block can be created according to the virtual file block execution request parameter. The file block creating and formatting module is used to create and format the virtual file block on one or more object storage target devices of the target file system according to the virtual file block creation request sent by the virtual file system client. Specifically, the file block creating and formatting module is used to obtain a determination result of the request parameter processing module after receiving the virtual file block request sent by the virtual file system client, and when the request parameter processing module determines that the virtual file block can be created, the file block creating and formatting module creates and formats the virtual file block on one or more object storage target devices of the target file system.

The user-mode application also sends the virtual file block parameter required by creation of the virtual file block to the virtual file system client, in which the virtual file block parameter includes the virtual file block execution request parameter. The request parameter processing module is mainly used to determine whether a request of the virtual file block can be executed according to the virtual file block execution request parameter. Specifically, the request parameter processing module is used to obtain the virtual file block execution request parameter in the virtual file block parameter, and determine whether the virtual file block can be created according to the parameter. The file block creating and formatting module mentioned above is used to determine whether to create the virtual file block according to the determination result of the request parameter processing module. When the request parameter processing module determines that the virtual file block can be created, the file block creating and formatting module creates the virtual file block on the object storage target device in the virtual file system.

Further, the virtual file block execution request parameter includes a size of the virtual file block and a format of the virtual file block. The request parameter processing module is used to obtain the virtual file block execution request parameter sent by the virtual file system client, and determine whether the virtual file block can be created according to the virtual file block execution request parameter.

Specifically, the request parameter processing module is used to obtain the size of the virtual file block and the format of the virtual file block that are sent by the virtual file system client, and detect whether storage capacity of the target file system and user storage quota of the target file system meet the requirements for creating the virtual file block according to the size of the received virtual file block. If the requirements are not met, report an error message; if met, detect whether the format is applicable to the format of the target file system according to the format of the received virtual file block. If the format is applicable, determine that the virtual file block can be created, and if not applicable, determine that the virtual file block cannot be created.

The virtual file block execution request parameter is mainly used to provide specific creation parameters after the virtual file block creation request is initiated to the virtual file system server. The virtual file block execution request parameter includes the size of the virtual file block and the format of the virtual file that the user needs to create. After the request parameter processing module receives the virtual file block execution request parameter, it is determined whether the target file system meets the requirements for creating the virtual file block according to the size of the virtual file block, the storage capacity of the target file system, and the user storage quota of the target file system. If the requirements are not met, it indicates that the virtual file block cannot be created, an error message is reported, and the creation of the virtual file block fails; if met, it is determined whether the target file system is applicable to creating the virtual file block according to the format of the virtual file block and the file format of the target file system. If the target file system is applicable, it is determined that the virtual file block can be created; if not applicable, it indicates that the virtual file block cannot be created, and an error message is reported.

Further, the virtual file block parameter also includes a virtual file block mounting request parameter, and the virtual file system server further includes a mounting and managing module. The mounting and managing module is used to obtain the virtual file block mounting request parameter, and is used to detect whether the virtual file block has been mounted on the shared directory according to the virtual file block mounting request parameter: if yes, exit the current operation, and if not, determine whether the virtual file block mounting request parameter is legal or not; if legal, the virtual file block is mounted on the shared directory, and if not legal, a rollback is performed on the current operation.

The virtual file block parameter sent by the user-mode application to the virtual file system client also includes a virtual file block mounting parameter, and the mounting and managing module is mainly used to execute the mounting of the virtual file block according to the virtual file block mounting parameter. Specifically, the mounting and managing module is used to obtain the virtual file block mounting parameter in the virtual file block parameter, and detect whether the virtual file block has been mounted on the shared directory according to the virtual file block mounting parameter. If yes, a mounting operation is not needed to be performed again, and the module can exit the current operation; if not, the module needs to determine whether the virtual file block mounting parameter is a legal parameter, for example, whether a mounting point that may be included in the parameter is a legal mounting point: if yes, the mounting of the virtual file block can be executed; if not, the module performs a rollback on the current operation and does not perform a mounting on the virtual file block.

Further, the mounting and managing module is used to obtain the virtual file block mounting request parameter, and to detect whether the virtual file block has been mounted on the shared directory according to the virtual file block mounting request parameter: if yes, exit the current operation. Specifically, the virtual file block mounting request parameter includes a mounting request directory and a mounting request mode, and the mounting and managing module is used to obtain the mounting request directory and the mounting request mode, and is used to detect whether the virtual file block has been mounted on the shared directory according to the mounting request directory. If yes, determine whether the mounting mode in which the current virtual file block is mounted on the shared directory is the same as the mounting request mode: if both are the same, exit the current operation; if not the same, change the mounting mode in which the current virtual file block is mounted on the shared directory into the mounting request mode.

The virtual file block mounting parameter acquired by the mounting and managing module includes the shared directory and the mounting request mode. The shared directory is a necessary bridge for realizing reading and writing the small files to the virtual file block by the user-mode application. The mounting request mode is a mode when the virtual file block is mounted on the shared directory. After obtaining the above two parameters, the mounting and managing module detects whether the virtual file block has been mounted on the shared directory according to the shared directory. If yes, the mounting and managing module needs to further determine whether the mounting mode in which the current virtual file block is mounted on the shared directory is the same as the mounting request mode: if both are the same, the existing mounting is not needed to be changed, and the module exits the current operation; if not, the mounting mode of the current virtual file block is changed according to the mounting request mode.

Further, the virtual file block parameter also includes a virtual file block permission parameter, and the virtual file system server further includes a permission management module. The permission management module is used to obtain the virtual file block permission parameter when the virtual file block is mounted on the shared directory, and modify group permission of the shared directory and read-write permission of the virtual file block according to the virtual file block permission parameter.

The permission management module is mainly used to modify the group permission of the shared directory and the read-write permission of the virtual file block, in which the group permission refers to a user and a group that a rewritable file belongs to while the read-write permission refers to the permission that the file can be read or written by the user. The user-mode application sends the virtual file block permission parameter to the virtual file system client. The permission management module included in the virtual file system server is used to obtain the virtual file block permission parameter, and modify the group permission and the read-write permission of the virtual file block according to the virtual file block permission parameter, so that the user can use the virtual file block to manage the small files more effectively.

Further, the virtual file block permission parameter includes a user UID/GID and a request read-write permission of the virtual file block. The permission management module is used to modify the group permission of the shared directory and the read-write permission of the virtual file block according to the virtual file block permission parameter. Specifically, The permission management module is used to verify correctness of the user UID/GID: if not correct, perform a rollback on the current operation; if correct, modify the group permission of the shared directory according to the user UID/GID and verify whether the request read-write permission of the virtual file block is legal or not: if legal, modify the read-write permission of the virtual file block according to the request read-write permission of the virtual file; if not legal, perform a rollback on the current operation.

After obtaining the virtual file block permission parameter, the permission management module needs to verify the correctness of the parameter. The virtual file block permission parameter also includes the user UID/GID, that is, an ID of the user and an ID of the group to which the user belongs. The permission management module first verifies the correctness of the user UID/GID in the permission parameters. If the parameter is not correct, perform a rollback on the current operation by the module; if the parameter is correct, modify the group permission of the shared directory according to the user UID/GID, and verify whether the request read-write permission of the virtual file block is legal or not: if legal, modify the read-write permission of the virtual file block according to the request read-write permission of the virtual file block; if not legal, perform a rollback on the current operation. The virtual file block permission parameter also includes the request read-write permission of the virtual file block, in which the request read-write permission refers to that the user requests to set read-write permission for the virtual file block. The permission management module is also used to modify the read-write permission of the virtual file block according to the request read-write permission, so that the user-mode application can read, write and store the small files in the virtual file block.

Further, the virtual file system server further includes a service registration module, which is used to obtain all the virtual file block parameters, and is used to add virtual file block registration information to the virtual file system client according to the obtained virtual file block parameters when the group permission of the shared directory and the read-write permission of the virtual file block have been modified.

The service registration module is mainly used to add the virtual file block registration information to the virtual file system client. Specifically, the service registration module is used to obtain virtual file block parameters. After the group permission of the shared directory and the read-write permission of the virtual file block have been modified by the permission management module, the service registration module takes the obtained virtual file block parameters as the virtual file block registration information and add the virtual file block registration information to the virtual file system client so as to manage the virtual file block on the virtual file system client and view the detailed information thereof.

Further, the virtual file block registration information includes the size of the virtual file block, the shared directory, the group permission of the shared directory, the read-write permission of the virtual file block, and the mounting request mode.

After obtaining the virtual file block parameters, the service registration module selects the size of the virtual file block, the shared directory on which the virtual file block is mounted, the group permission of the shared directory, the read-write permission of the virtual file block, and the mounting request mode in which the virtual file block is mounted on the shared directory, and takes these as the main content of the virtual file block registration information, which is beneficial for the user-mode application to manage the virtual file block through the virtual file system client.

Compared with the prior art, some beneficial effects of the present invention are as follows.

(1) A virtual folder is created in the target file system, and the user-mode application is enabled to read and write the small files in the virtual file block through the network file system, so that the small files are centrally stored in the virtual folder to facilitate management, reading and writing of the small files. The virtual file system of the present invention can greatly improve the read-write performance of massive small files, and preserve the advantages of distributed shared storage that is easy to be managed and can be mounted anywhere based on the network.

(2) The creation, formatting, and mounting operations of the virtual file system can be performed by hiding a privileged=true container. Since hiding of the privileged=true container makes it impossible for the user to directly access the container, a problem can be avoided that the user can use GPU resources without limitation when actually using the container. The hidden container uses NFS file system service, and when the user needs the virtual file system service in actual application, the NFS file system is mounted in the user application, so that a virtual file system tool is used in a transfer mode.

DETAILED DESCRIPTION OF THE EMBODIMENT

Figure 1:
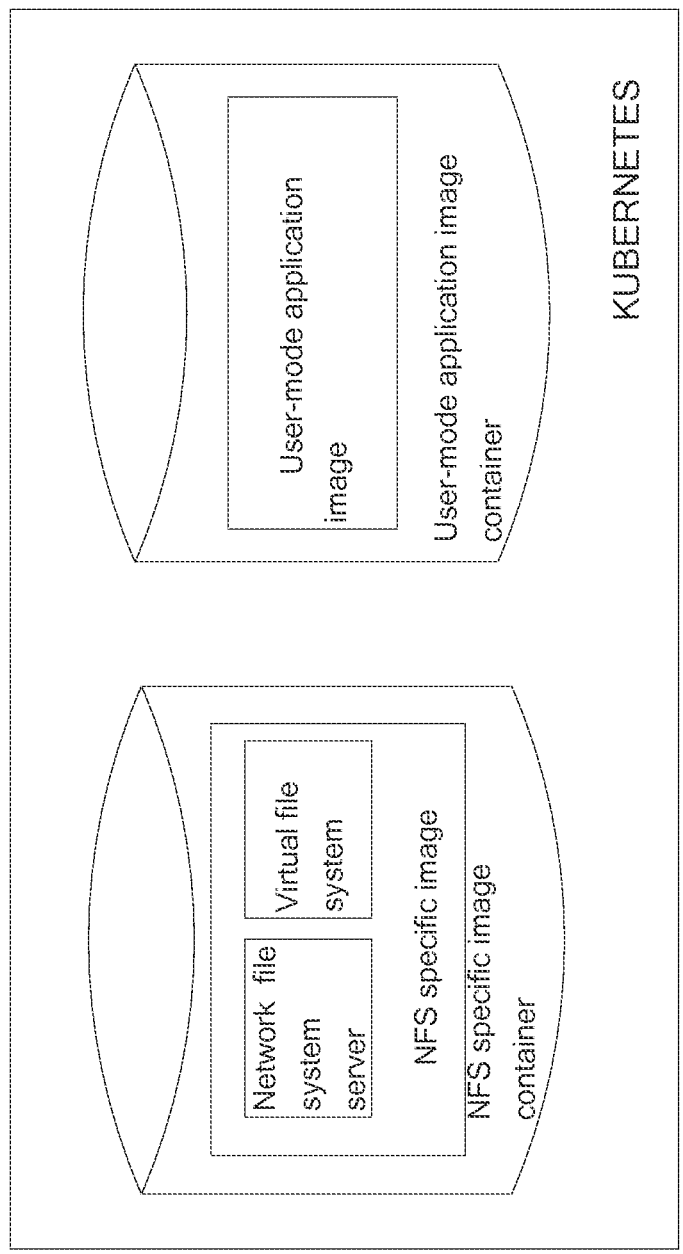
FIG. 1 is a schematic view showing distribution of containers of a KUBERNETES cluster in the first embodiment of the present invention.

The drawings of the present invention are for illustrative purpose only and are not to be construed as limiting the invention. Some components in the drawings may be omitted, enlarged, or reduced for better illustrating the following embodiments, and sizes of these components do not represent that of actual products. For those skilled in the art, it will be understood that some known structures and descriptions thereof in the drawings may be omitted.

According to an embodiment, the small-file storage optimization system based on a virtual file system in a KUBERNETES user-mode application is applied to a file system of a KUBERNETES cluster, namely a target file system. The target file system includes an object storage server and an object storage target device. The object storage server is configured to be responsible for interaction and data storage between the target file system client and physical storage, and the target file system client accesses file data stored in the object storage target device through the object storage server.

The optimization system according to the present embodiment includes a user-mode application, a network file system and a virtual file system. The virtual file system includes a virtual file system client and a virtual file system server. The network file system includes a network file system server and a network file system client. The network file system client is in the user-mode application.

Referring to FIG. 1, in the KUBERNETES cluster, the network file system server and the virtual file system are encapsulated in the same image which is a NFS specific image, and the NFS specific image is located in an NFS specific image container. The user-mode application is encapsulated in a user-mode application image which is located in a user-mode application image container.

The user-mode application image container and the NFS specific image container are run in a KUBERNETES-DEPLOYMENT method, in which the NFS specific image container is run in a permission method of PRIVILEGED=TRUE, and the network file system server in the NFS specific image container exposes a network file service mounting point, i.e., a shared directory by KUBERNETE-SSERVICE.

Figure 2:
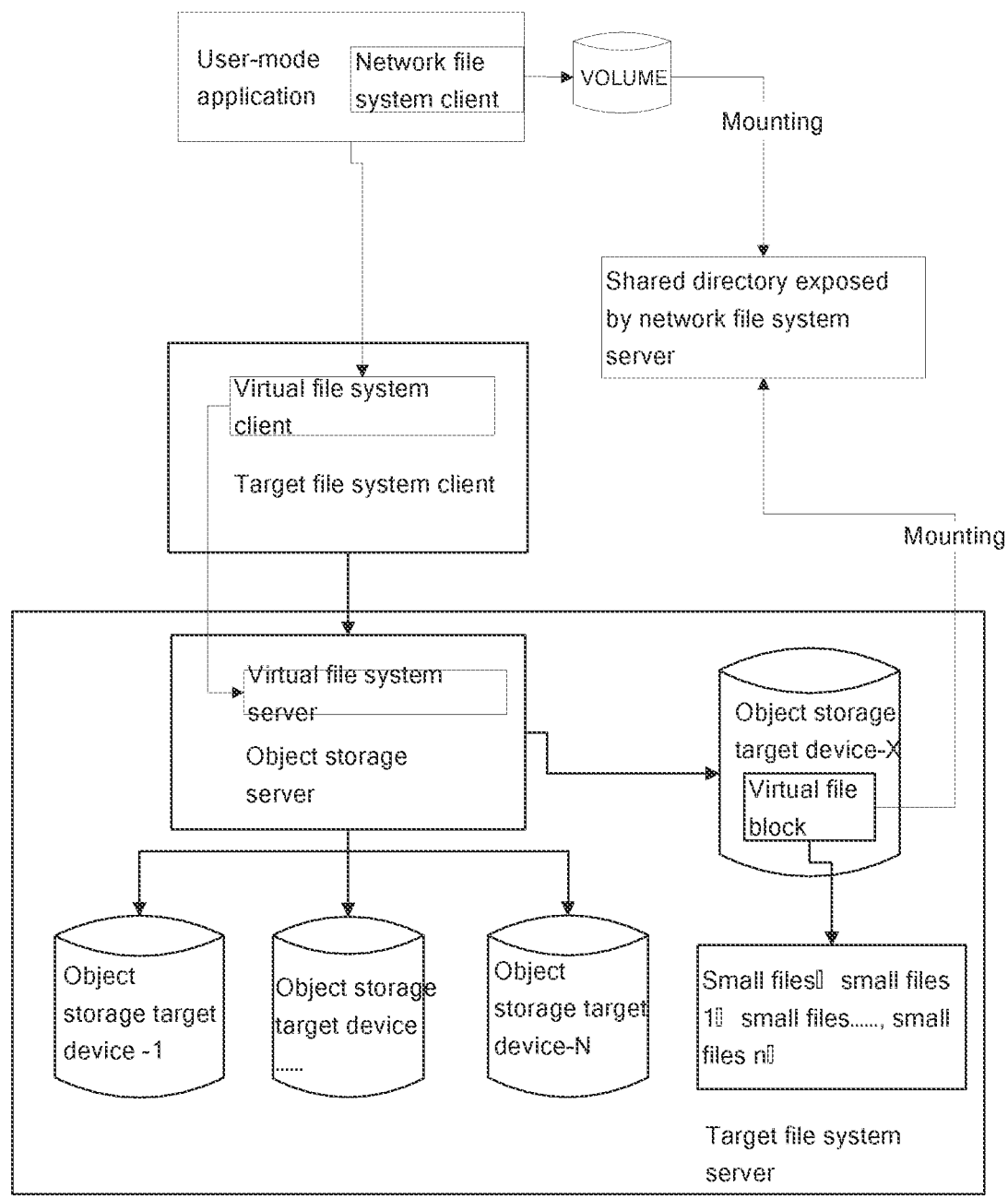
FIG. 2 is a schematic view showing an interaction of an optimization system and a target file system on the KUBERNETES cluster in the first embodiment of the present invention.

As shown in FIG. 2, the user-mode application is configured to send a virtual file block creation request to the virtual file system client, and the user-mode application is mounted on the shared directory exposed by the network file system server through a VOLUME by using the network file system client included in the user-mode application. The virtual file system client is deployed on a target file system client and is configured to send a virtual file block creation request sent by the user-mode application to the virtual file system server, and the virtual file system server is deployed on the object storage server of the target file system.

The virtual file system server includes a file block creating and formatting module. The file block creating and formatting module can be used to manage one or more object storage target devices since this module is on the object storage server and is used to create and format virtual file blocks on one or more object storage target devices. In this embodiment, the file block creating and formatting module creates and formats a virtual file block on an object storage target device X of one target file system after receiving the virtual file block creation request sent by the virtual file system client, in which the virtual file block is used to store small files.

The virtual file block is mounted on the shared directory exposed by the network file system server in the same way as the user-mode application, thereby realizing a purpose that the user-mode application reads and writes the small files to the virtual file block through the network file system. In a KUBERNETES cluster environment, the virtual file block is set on one or more object storage target devices of the target file system in order to specially store the small files, so that the small files are stored in the virtual file block and can be managed more efficiently, and the efficiency of storing, reading and writing the small files is improved.

Figure 3:
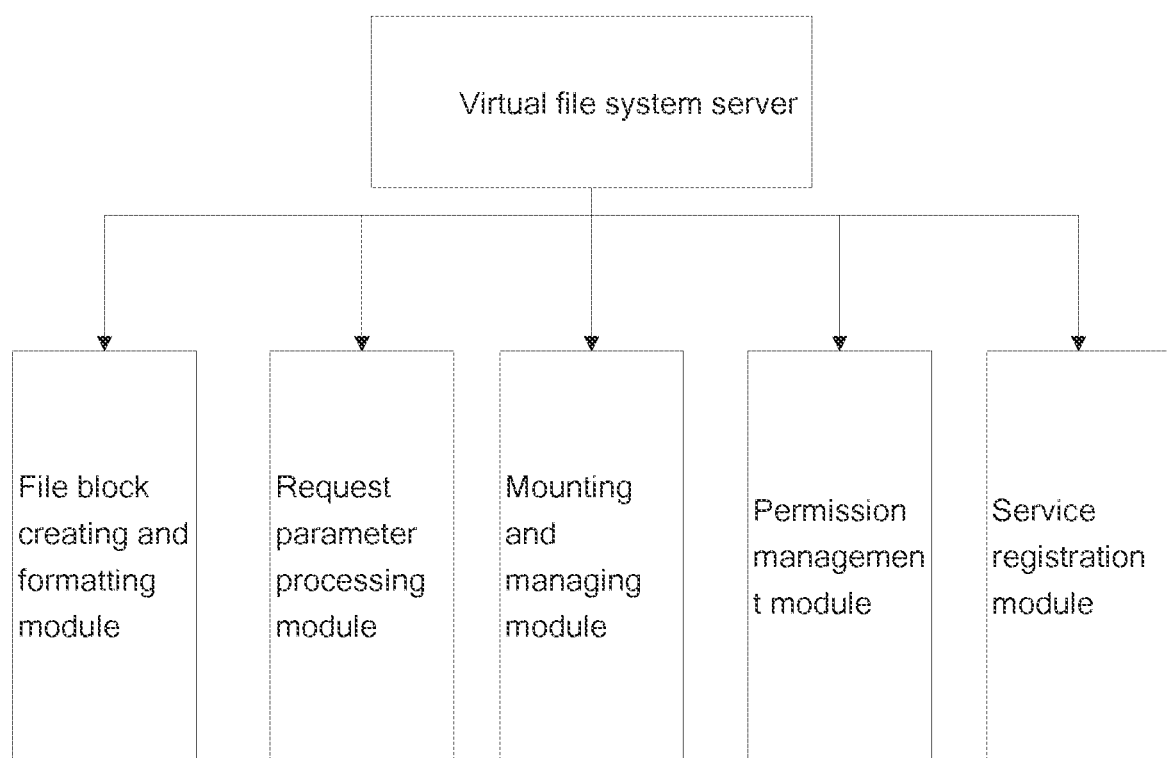
FIG. 3 is a schematic structural view of a virtual file system server in the first embodiment of the present invention.

Preferably, as shown in FIG. 3, the virtual file system server further includes a request parameter processing module. The user-mode application is also configured to send a virtual file block parameter to the virtual file system client, and the virtual file system client is also configured to send the virtual file block parameter sent by the user-mode application to the virtual file system server. The virtual file block parameter includes a virtual file block execution request parameter. The virtual file block execution request parameter includes a size of the virtual file block and a format of the virtual file block. The request parameter processing module is configured to obtain the size of the virtual file block and the format of the virtual file block, and determine whether the virtual file block can be created according to the virtual file block execution request parameter; the file block creating and formatting module is configured to create and format the virtual file block on one or more object storage target devices of the target file system according to the virtual file block creation request sent by the virtual file system client; specifically, the file block creating and formatting module is used to obtain a determination result of the request parameter processing module after receiving the virtual file block request sent by the virtual file system client, and when the request parameter processing module determines that the virtual file block can be created, the file block creating and formatting module creates and formats the virtual file block on one or more object storage target devices of the target file system.

Figure 4:
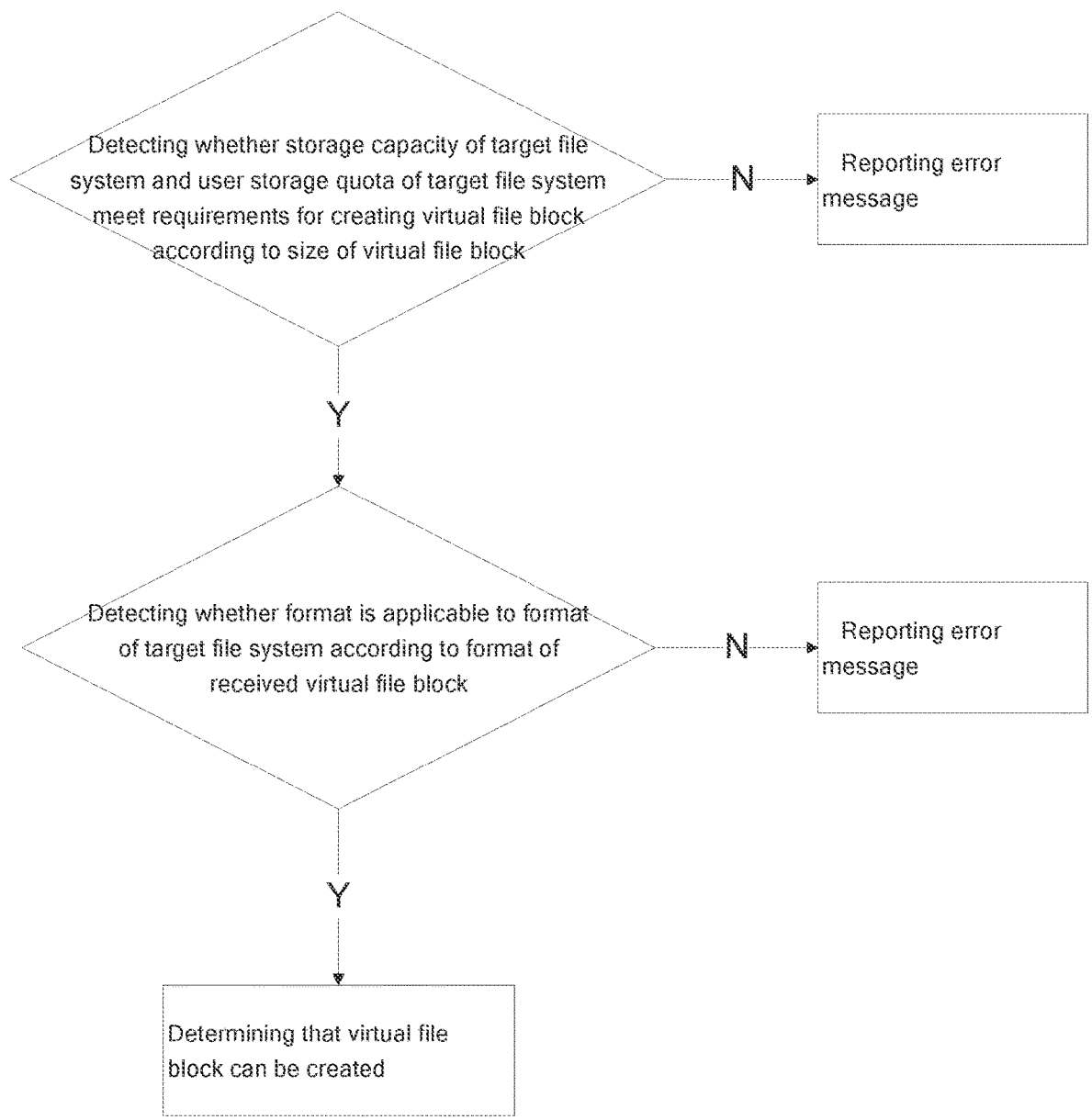
FIG. 4 is a flowchart of a process for a request parameter processing module in the first embodiment of the present invention.

As shown in FIG. 4, a specific determination process of the request parameter processing module is as follows: detecting whether storage capacity of the target file system and user storage quota of the target file system meet the requirements for creating the virtual file block according to the size of the virtual file block; if the requirements are not met, reporting an error message; if met, detecting whether the format is applicable to the format of the target file system according to the format of the virtual file block; if the format is applicable, determining that the virtual file block can be created; if not applicable, reporting an error message.

Preferably, as shown in FIG. 3, the virtual file system server further includes a mounting and managing module, the virtual file block parameter also includes a virtual file block mounting request parameter. The virtual file block mounting request parameter includes the shared directory and a mounting request mode; the mounting and managing module is used to obtain the shared directory and the mounting request mode sent by the virtual file system client, and is used to execute the following operations according to the above two parameters.

Figure 5:
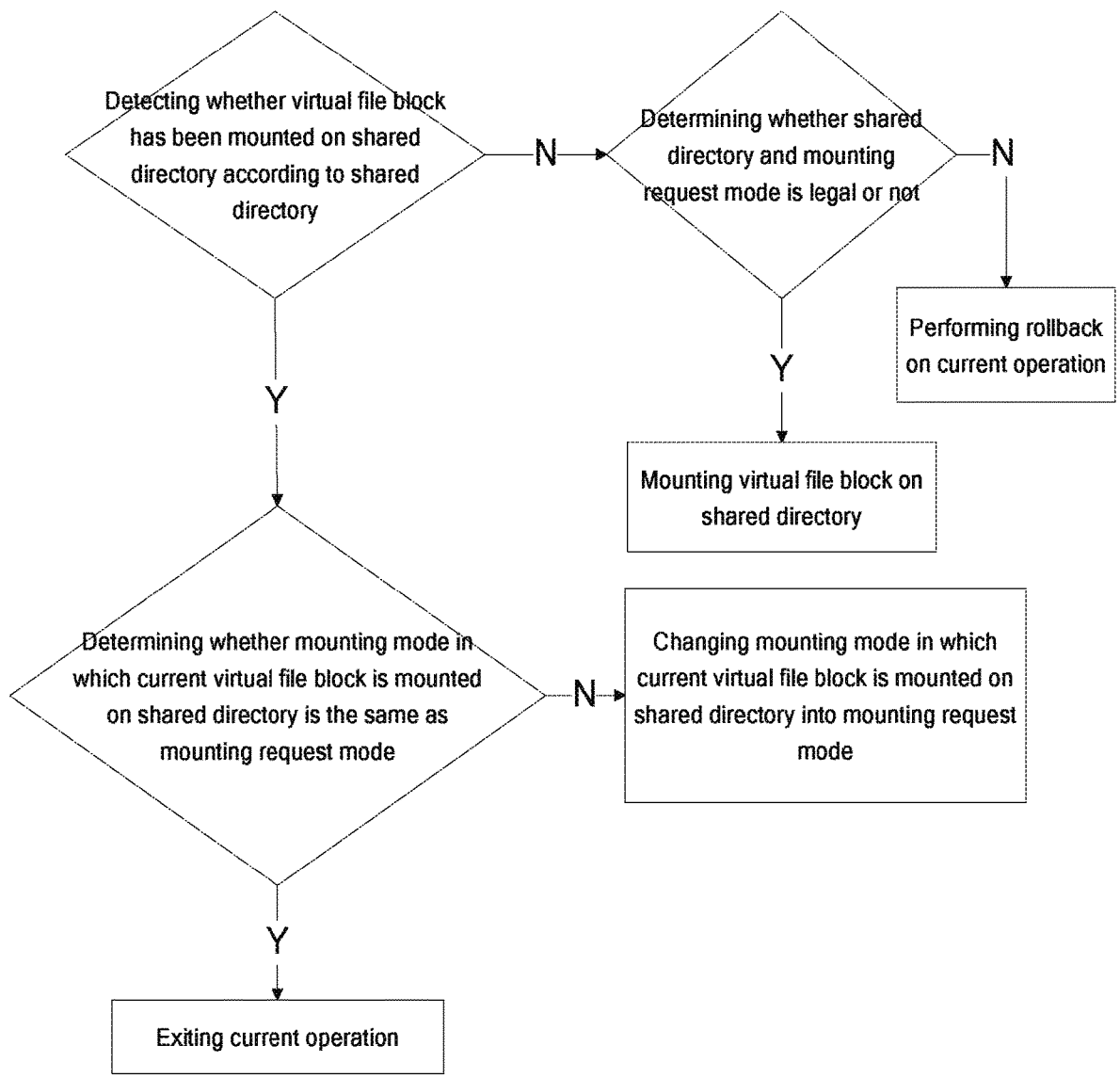
FIG. 5 is a flowchart of a process for a mounting and managing module in the first embodiment of the present invention.

As shown in FIG. 5, the mounting and managing module detects whether the virtual file block has been mounted on the shared directory according to the shared directory. If the virtual file block has not been mounted on the shared directory, determine whether the shared directory and the mounting request mode are legal or not: if legal, mount the virtual file block on the shared directory, and if not legal, perform a rollback on the current operation. If the virtual file block has been mounted on the shared directory, determine whether a mounting mode in which the current virtual file block is mounted on the shared directory is the same as the mounting request mode: if both are the same, exit the current operation, and if not the same, change the mounting mode in which the current virtual file block is mounted on the shared directory into the mounting request mode.

Preferably, as shown in FIG. 3, the virtual file system server further includes a permission management module. The permission management module is used to obtain a virtual file block permission parameter sent by the virtual file system client when the virtual file block is mounted on the shared directory, and modify group permission of the shared directory and read-write permission of the virtual file block according to the virtual file block permission parameter. The virtual file block permission parameter includes a user UID/GID and a request read-write permission of the virtual file block.

Figure 6:
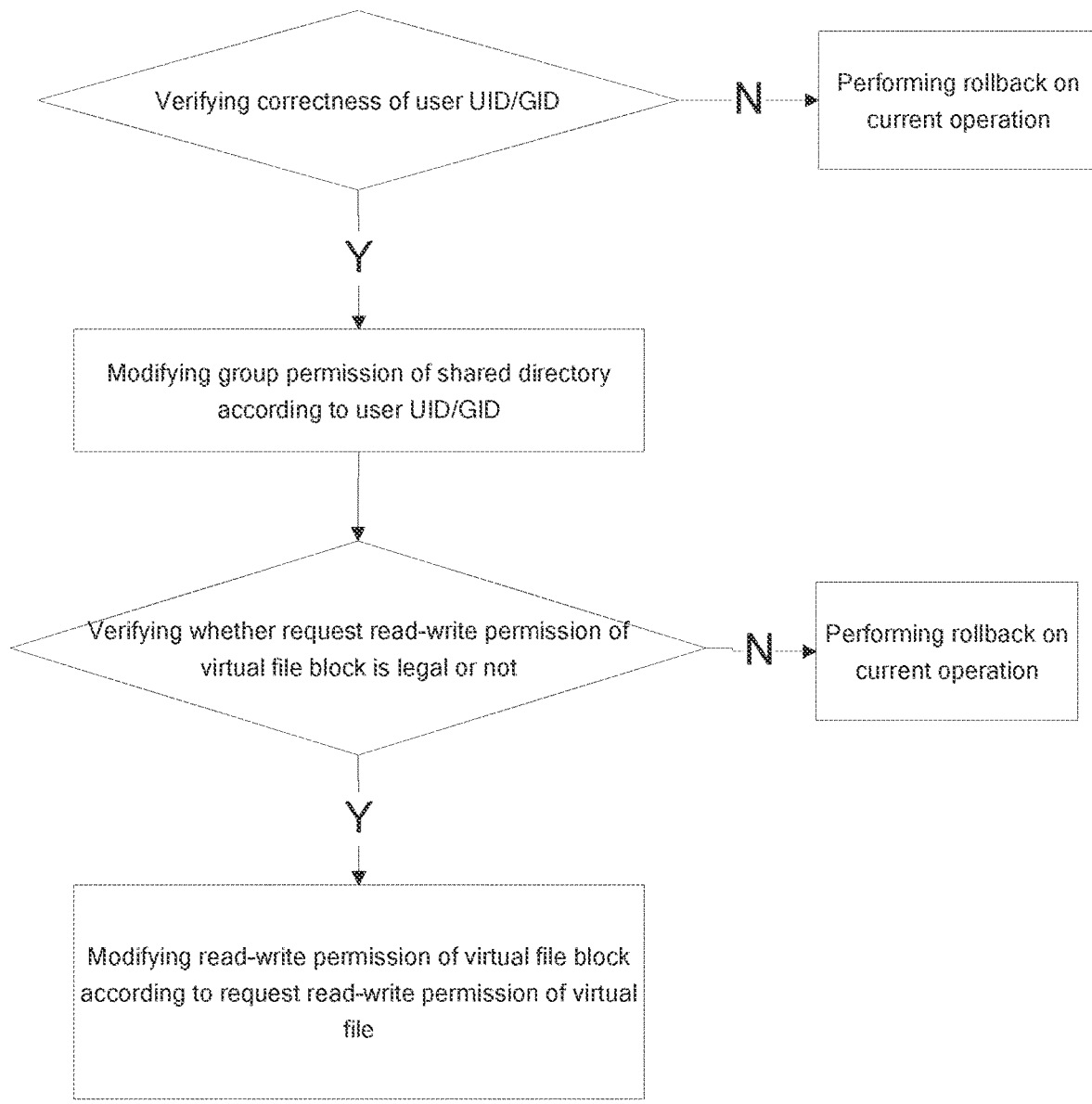
FIG. 6 is a flowchart of a process for a permission management module in the first embodiment of the present invention.

As shown in FIG. 6, the permission management module modifies the group permission and the read-write permission of the virtual file block according to the virtual file block permission parameter. The specific process is that: verifying correctness of the user UID/GID after obtaining the user UID/GID in the virtual file block permission parameter and the request read-write permission of the virtual file block; if not correct, perform a rollback on the current operation, and if correct, modify the group permission of the virtual file block according to the user UID/GID, and verify whether the request read-write permission of the virtual file block is legal or not; if legal, modify the read-write permission of the virtual file block according to the request read-write permission of the virtual file block, and if not legal, perform a rollback on the current operation.

Preferably, as shown in FIG. 3, the virtual file system server further includes a service registration module, which is used to obtain all the virtual file block parameters sent by the virtual file system client and is use to add virtual file block registration information to the virtual file system client according to the obtained virtual file block parameter when the group permission of the shared directory and the read-write permission of the virtual file block have been modified. The virtual file block registration information includes the size of the virtual file block, the shared directory, the group permission of the shared directory, the read-write permission of the virtual file block, and the mounting request mode.

Obviously, the above embodiment of the present invention is merely an example for clear illustration of the technical solution in the invention, and is not intended to limit the implementations of the present invention. Any modification, equivalent substitution, improvement, or the like within the spirit and principle of the claims of the invention should be included in the scope of the claims of the invention.

The invention claimed is:

1. A small-file storage optimization system based on a virtual file system in a kubernetes user-mode application, which is applied to a target file system, kubernetes being an application tool for automating deployment scaling and management of containerized applications, the small-file storage optimization system comprising a hardware processor and a memory, the hardware processor being configured function as:
   a user-mode application,
   a network file system comprising a network file system server, and a network file system client which is included in the user-mode application, and
   a virtual file system comprising a virtual file system client and a virtual file system server,
      wherein the network file system server and the virtual file system are encapsulated in a same image which is located in an NFS specific image container, the user-mode application is encapsulated in a user-mode application image which is located in a user-mode application image container, the NFS specific image container and the user-mode application image container are both deployed in a kubernetes cluster, and the target file system is a file system used by the kubernetes cluster,
      wherein after running the user-mode application image container and running the network file system (NFS) specific image container in a method of privileged is equal to true, the user-mode application, the network file system client, and the network file system server and the virtual file system are all in a same kubernetes cluster network, the user-mode application is mounted on a shared directory exposed by the network file system server through the network file system client, and the user-mode application is configured to send a virtual file block creation request to the virtual file system client,
      wherein the virtual file system client is deployed on a target file system client, and the virtual file system client is configured to send the virtual file block creation request sent by the user-mode application to the virtual file system server,
   wherein the virtual file system server is deployed on an object storage server of the target file system; the virtual file system server includes a file block creating and formatting module which is configured to create and format a virtual file block on one or more object storage target devices of the target file system according to the virtual file block creation request sent by the virtual file system client,
   wherein the virtual file block is configured to store small files and is mounted on the shared directory exposed by the network file system server, and
   wherein the file block creating and formatting module is configured to create and format the virtual file block on one or more object storage target devices of the target file system according to the virtual file block creation request sent by the virtual file system client, in which the file block creating and formatting module is configured to obtain a determination result of the request parameter processing module after receiving the virtual file block request sent by the virtual file system client, and when the request parameter processing module determines that the virtual file block can be created, the file block creating and formatting module creates and formats the virtual file block on one or more object storage target devices of the target file system.

2. The small-file storage optimization system based on the virtual file system in the kubernetes user-mode application according to claim 1,
   wherein the user-mode application is further configured to send a virtual file block parameter to the virtual file system client, the virtual file system client is further configured to send the virtual file block parameter sent by the user-mode application to the virtual file system server, the virtual file block parameter includes a virtual file block execution request parameter, and the virtual file system server also includes a request parameter processing module configured to obtain the virtual file block execution request parameter sent by the virtual file system client, and determine whether the virtual file block can be created according to the virtual file block execution request parameter.

3. The small-file storage optimization system based on the virtual file system in the kubernetes user-mode application according to claim 2,
   wherein the virtual file block execution request parameter includes a size of the virtual file block and a format of the virtual file block; the request parameter processing module is configured to obtain the virtual file block execution request parameter sent by the virtual file system client, and determine whether the virtual file block can be created according to the virtual file block execution request parameter, in which
   the request parameter processing module is configured to obtain the size of the virtual file block and the format of the virtual file block that are sent by the virtual file system client, and detect whether storage capacity of the target file system and user storage quota of the target file system meet the requirements for creating the virtual file block according to the size of the received virtual file block; if the requirements are not met, an error message is reported; if met, it is detected whether the format is applicable to the format of the target file system according to the format of the received virtual file block; if the format is applicable, it is determined that the virtual file block can be created; if not applicable, an error message is reported.

4. The small-file storage optimization system based on the virtual file system in the kubernetes user-mode application according to claim 2,
   wherein the virtual file block parameter further includes a virtual file block mounting request parameter, and the virtual file system server further includes a mounting and managing module, and
   wherein the mounting and managing module is configurated to obtain the virtual file block mounting request parameter sent by the virtual file system client, and detect whether the virtual file block has been mounted on the shared directory according to the virtual file block mounting request parameter; if yes, exit the current operation, and if not, determine whether the virtual file block mounting request parameter is legal or not; if legal, the virtual file block is mounted on the shared directory, and if not legal, a rollback is performed on the current operation.

5. The small-file storage optimization system based on the virtual file system in the kubernetes user-mode application according to claim 4, wherein the virtual file block mounting request parameter includes the shared directory and a mounting request mode; the mounting and managing module is configured to obtain the virtual file block mounting request parameter sent by the virtual file system client, and is configured to detect whether the virtual file block has been mounted on the shared directory according to the virtual file block mounting request parameter; if yes, exit the current operation, in which the mounting and managing module is configured to obtain the mounting request directory and the mounting request mode sent by the virtual file system client, and is used to detect whether the virtual file block has been mounted on the shared directory according to the shared directory; if yes, it is determined whether a mounting mode in which a current virtual file block is mounted on the shared directory is the same as the mounting request mode: if both are the same, exit the current operation, and if not the same, the mounting mode in which the current virtual file block is mounted on the shared directory is changed into the mounting request mode.

6. The small-file storage optimization system based on the virtual file system in the kubernetes user-mode application according to claim 4, wherein the virtual file block parameter further includes a virtual file block permission parameter, the virtual file system server further includes a permission management module, and the permission management module is configured to obtain the virtual file block permission parameter sent by the virtual file system client when the virtual file block is mounted on the shared directory and modify group permission of the shared directory and read-write permission of the virtual file block according to the virtual file block permission parameter.

7. The small-file storage optimization system based on the virtual file system in the kubernetes user-mode application according to claim 6, wherein the virtual file block permission parameter includes a user identifier (UID)/group identifier (GID) and a request read-write permission of the virtual file block, and the permission management module is configured to modify the group permission of the shared directory and the read-write permission of the virtual file block according to the virtual file block permission parameter; in which the permission management module is configured to verify correctness of the user UID/GID: if correct, the group permission of the shared directory is modified according to the user UID/GID; if not correct, a rollback is performed on the current operation; the permission management module is also used to modify the read-write permission of the virtual file block according to the request read-write permission of the virtual file block.

8. The small-file storage optimization system based on the virtual file system in the kubernetes user-mode application according to claim 6, wherein the virtual file system server further includes a service registration module configured to obtain all the virtual file block parameters sent by the virtual file system server, and configured to add virtual file block registration information to the virtual file system client according to the obtained virtual file block parameters when the group permission and the read-write permission of the virtual file block have been modified.

9. The small-file storage optimization system based on the virtual file system in the kubernetes user-mode application according to claim 8, wherein the virtual file block registration information includes the size of the virtual file block, the shared directory, the group permission of the shared directory, the read-write permission of the virtual file block, and the mounting request mode.

* * * * *